(12) United States Patent
Brown (10) Patent No.: US 7,816,900 B2
(45) Date of Patent: Oct. 19, 2010

(54) CORRECTION CIRCUIT FOR IMPROVED LOAD TRANSIENT RESPONSE

(75) Inventor: James Steven Brown, San Pedro, CA (US)

(73) Assignee: International Rectifier Corporation, El Segundo, CA (US)

( * ) Notice: Subject to any disclaimer, the term of this patent is extended or adjusted under 35 U.S.C. 154(b) by 213 days.

(21) Appl. No.: 11/695,859

(22) Filed: Apr. 3, 2007

(65) Prior Publication Data

US 2007/0236201 A1 Oct. 11, 2007

Related U.S. Application Data

(60) Provisional application No. 60/789,249, filed on Apr. 5, 2006.

(51) Int. Cl.
*G05F 1/40* (2006.01)

(52) U.S. Cl. .................. 323/285; 323/290; 323/284

(58) Field of Classification Search ................. 323/222, 323/224, 283, 284, 285, 290, 301, 302
See application file for complete search history.

(56) References Cited

U.S. PATENT DOCUMENTS

| | | | |
|---|---|---|---|
| 6,057,607 A | 5/2000 | Rader, III et al. | |
| 6,172,885 B1 | 1/2001 | Feldtkeller | |
| 6,724,174 B1 * | 4/2004 | Esteves et al. | 323/224 |
| 6,815,937 B2 * | 11/2004 | Poon et al. | 323/282 |
| 6,909,266 B2 | 6/2005 | Kernahan et al. | |
| 2006/0061342 A1 | 3/2006 | Bernacchia et al. | |
| 2007/0078568 A1 * | 4/2007 | Donaldson et al. | 700/298 |

* cited by examiner

*Primary Examiner*—Jessica Han
(74) *Attorney, Agent, or Firm*—Farjami & Farjami LLP (57) ABSTRACT

A correction circuit for use in a switched power supply wherein the correction circuit provides a correction signal indicating a duty cycle adjustment necessary to modify pulse width modulation of the power supply such that the output inductor current matches the load current drawn by a load connected to the power supply. The correction circuit may be used in conjunction with feed forward and/or feed back control circuits. The correction circuit may be implemented using either digital or analog circuit components.

25 Claims, 9 Drawing Sheets

CORRECTION CIRCUIT FOR IMPROVED LOAD TRANSIENT RESPONSE

CROSS REFERENCE TO RELATED APPLICATIONS

The present application claims benefit of and priority to U.S. Provisional Patent Application No. 60/789,249 entitled DELTA I CORRECTION FOR IMPROVED LOAD TRANSIENT RESPONSE filed Apr. 5, 2006, the entire contents of which are hereby incorporated by reference herein.

BACKGROUND OF THE INVENTION

The present invention relates a correction circuit for improving feed forward or feedback regulation in switched power supplies. In particular, the present invention relates to a correction circuit that measures a difference between inductor current and output current and provides a correction parameter to quickly adjust the duty factor of the pulse width modulation of the switched power supply to correct for this difference.

Control of output voltage in switching power supplies has long been an important consideration. For most applications, it is desirable to maintain output voltage and current at a more or less steady value, or within a desired window of values. For example, power supplies that are used as microprocessor power supplies must stay within a rather narrow window despite rather fast load transients on the output end thereof.

A common means for controlling output voltage is the use of feedback. However, these feedback control systems often require a tradeoff in stability in order to allow for improved transient response. This is due to the relatively fixed relationships between operating frequencies and control loop crossover frequencies.

Several approaches have been considered in order to address this shortcoming. One approach is to raise the supply operating frequency while lowering the value of the output inductor value. Another option is to add a "load line" which effectively raises the output impedance of the power supply to more effectively use the available window of output voltage values. Another idea is to add capacitors at the output in order to ensure that the output voltage remains in the desired window of values. Further, the use of output voltage excursions to trigger circuitry that rapidly changes duty factor has also been considered.

Another solution is contemplated by U.S. Pat. No. 6,753,723, the entire contents of which are hereby incorporated by reference herein. In this reference, the synchronous FET is turned off during a step down load transient in order to increase the voltage available to change the inductor current. While all of these approaches improve the situation, they add additional components, cost or complexity and typically do not provide a fast enough transient response. At best, they react to a problem (over/under voltage) that has already occurred.

U.S. Pat. No. 6,954,054, which is hereby incorporated by reference herein, contemplates a feed forward control approach that also attempts to address the problem of voltage control. While the feed forward control loop proposed in this reference allows for a quick response to the final duty factor, there is still a delay in the time that it takes for the inductive storage element(s) to reach a level appropriate for the new load current. The response time is related to the RL time constant of the power supply storage inductor and the equivalent resistance of the power supply. In other words, the droop in output voltage during load transient is what powers the change in the inductor current.

Thus, it would be beneficial to provide a control circuit for a switching power supply that avoids the problems discussed above.

SUMMARY OF THE INVENTION

It is an object of the present invention to provide a correction circuit that provides a computed correction value that is used to rapidly charge or discharge power supply storage induction elements. The circuit may be implemented via either analog or digital circuitry and is preferably applicable for use with either feedback or feed forward control circuits.

A correction circuit for use in correcting a duty cycle of pulse width modulation of a switched power supply to match inductor current of the power supply to load current in accordance with an embodiment of the present invention includes a first comparator operable to compare the inductor current to the load current and to provide a current difference signal, a first multiplier operable to multiply the current difference signal by an inductance value of the inductor of the switched power supply, a second comparator operable to compare an input voltage of the switched power supply to an output voltage and to provide a voltage difference signal, a divider operable to divide the output of the first multiplier by the voltage difference signal and a second multiplier operable to multiply the output of the divider by the frequency of the switched power supply to provide a correction value for use in adjusting a duty cycle of the pulse width modulation of the power supply such that the inductor current matches the output current.

A switched power supply in accordance with an embodiment of the present invention includes an output stage including an inductor and an output capacitor across which an output voltage is provided to a load, wherein the output voltage is controlled in part based on pulse width modulation and a correction circuit for use in correcting a duty cycle of the pulse width modulation such that an inductor current of the inductor is matched to a load current drawn by the load. The correction circuit includes a first comparator operable to compare the inductor current to the load current and to provide a current difference signal, a first multiplier operable to multiply the current difference signal by an inductance value of the inductor, a second comparator operable to compare an input voltage of the switched power supply to the output voltage and to provide a voltage difference signal, a divider operable to divide the output of the first multiplier by the voltage difference signal and a second multiplier operable to multiply the output of the divider by the frequency of the switched power supply to provide a correction value for use in adjusting the duty cycle of the pulse width modulation of the switched power supply such that the inductor current matches the load current.

A switched power supply in accordance with an embodiment of the present invention includes an output stage including an output inductor and an output capacitor across which an output voltage is provided to a load, wherein the output voltage is controlled in part based on pulse width modulation, a control circuit operable to control the output voltage of the switched power supply and to provide an error value for adjusting the pulse width modulation of the switched power supply to control the output voltage and a correction circuit for use in correcting a duty cycle of the pulse width modulation such that an inductor current of the inductor is matched to a load current drawn by the load. The correction circuit includes a first comparator operable to compare the inductor current to the load current and to provide a current difference signal, a first multiplier operable to multiply the current difference signal by an inductance value of the inductor, a second comparator operable to compare an input voltage to the output voltage and to provide a voltage difference signal, a divider operable to divide the output of the first multiplier by the voltage difference signal and a second multiplier operable to multiply the output of the divider by the frequency of the switched power supply to provide a correction value for use in adjusting the duty cycle of the pulse width modulation of the power supply such that the inductor current matches the load current.

A switched power supply in accordance with an embodiment of the present invention includes an output stage including an inductor and an output capacitor across which an output voltage is provided to a load, wherein the output voltage is controlled in part based on pulse width modulation and a correction circuit operable to provide a correction value for use in adjusting a duty cycle of the pulse width modulation such that an inductor current of the inductor is matched to a load current drawn by the load. The correction value is provided from a look up table based on a difference between the inductor current and the load current. an output stage including an inductor and an output capacitor across which an output voltage is provided to a load, wherein the output voltage is controlled in part based on pulse width modulation and a correction circuit operable to provide a correction value for use in correcting a duty cycle of the pulse width modulation such that an inductor current of the inductor is matched to a load current drawn by the load, wherein the correction value is provided from a look up table based on a difference between an inductor current through the inductor a load current drawn by the load.

Other features and advantages of the present invention will become apparent from the following description of the invention which refers to the accompanying drawings.

DETAILED DESCRIPTION OF PREFERRED EMBODIMENTS OF THE INVENTION

Figure 1:
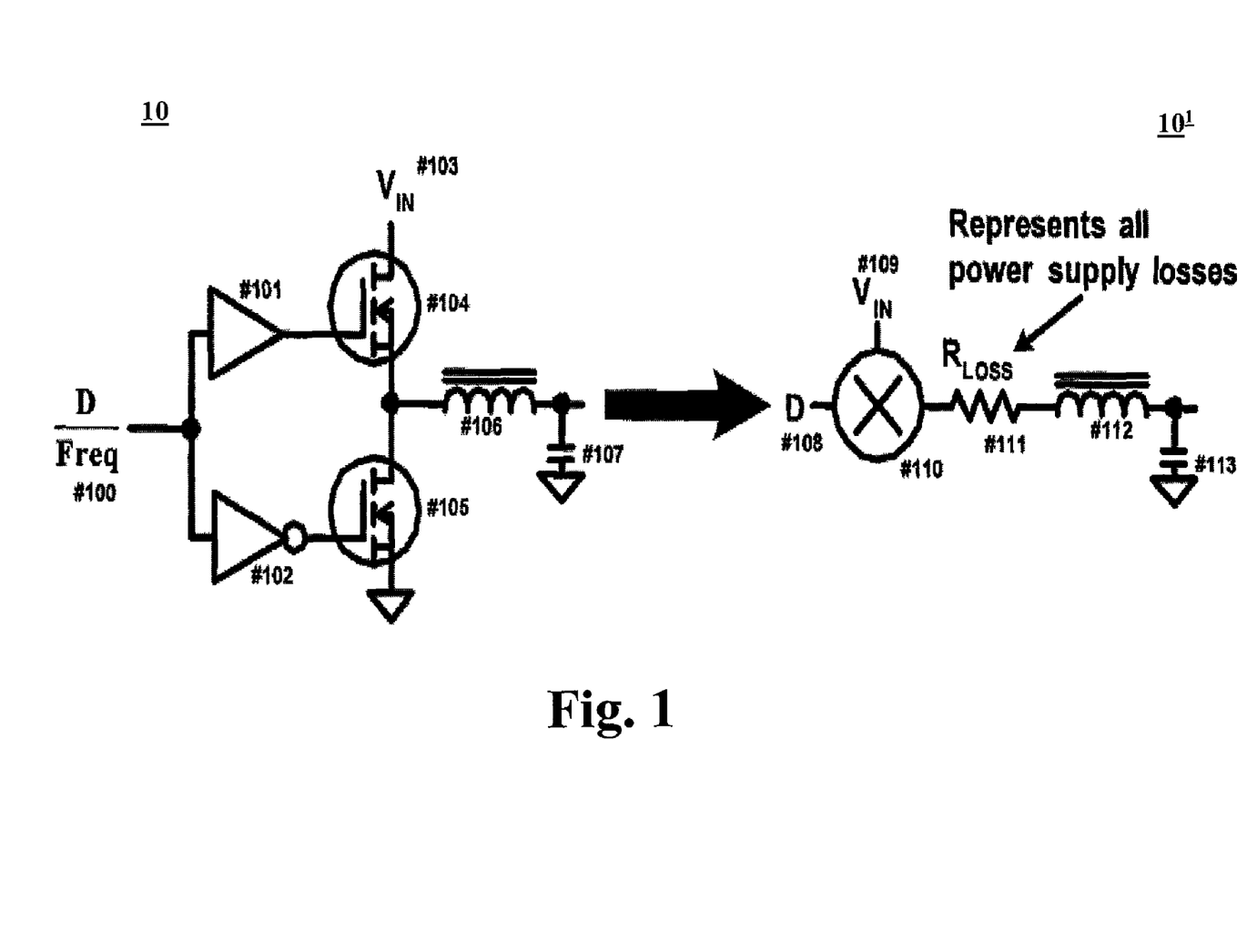
FIG. 1 illustrates a simplified mathematical representation of an output stage of a synchronous buck converter.

In FIG. 1, the output stage 10 of a synchronous buck converter is represented in simplified mathematical form $10^1$.

In simplified form, the transistors 104, 105 and their drivers 101,102 are represented by multiplier 110. The control FET on time 100 (D/Freq.) is represented by a duty factor 108 (D). Loss element 111 ($R_{LOSS}$) represents all losses associated with the buck converter output stage 10 including elements that add to the natural load line of the output stage. The inductor 112 corresponds to the output inductor 106 and the capacitor 113 corresponds to the output capacitor 107.

Figure 2:
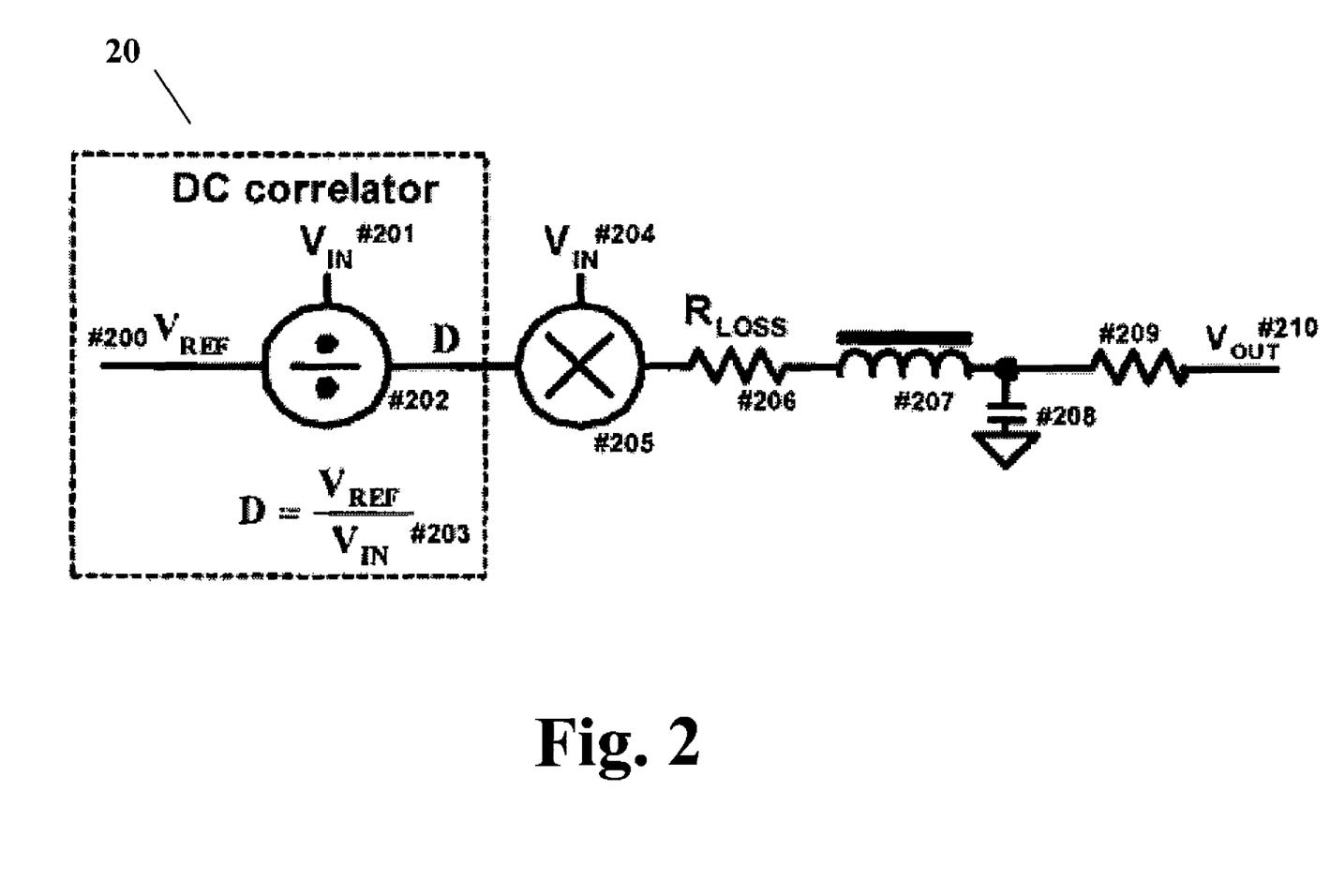
FIG. 2 illustrates a simplified mathematical representation of a buck converter including a feed forward control circuit.
Figure 3:
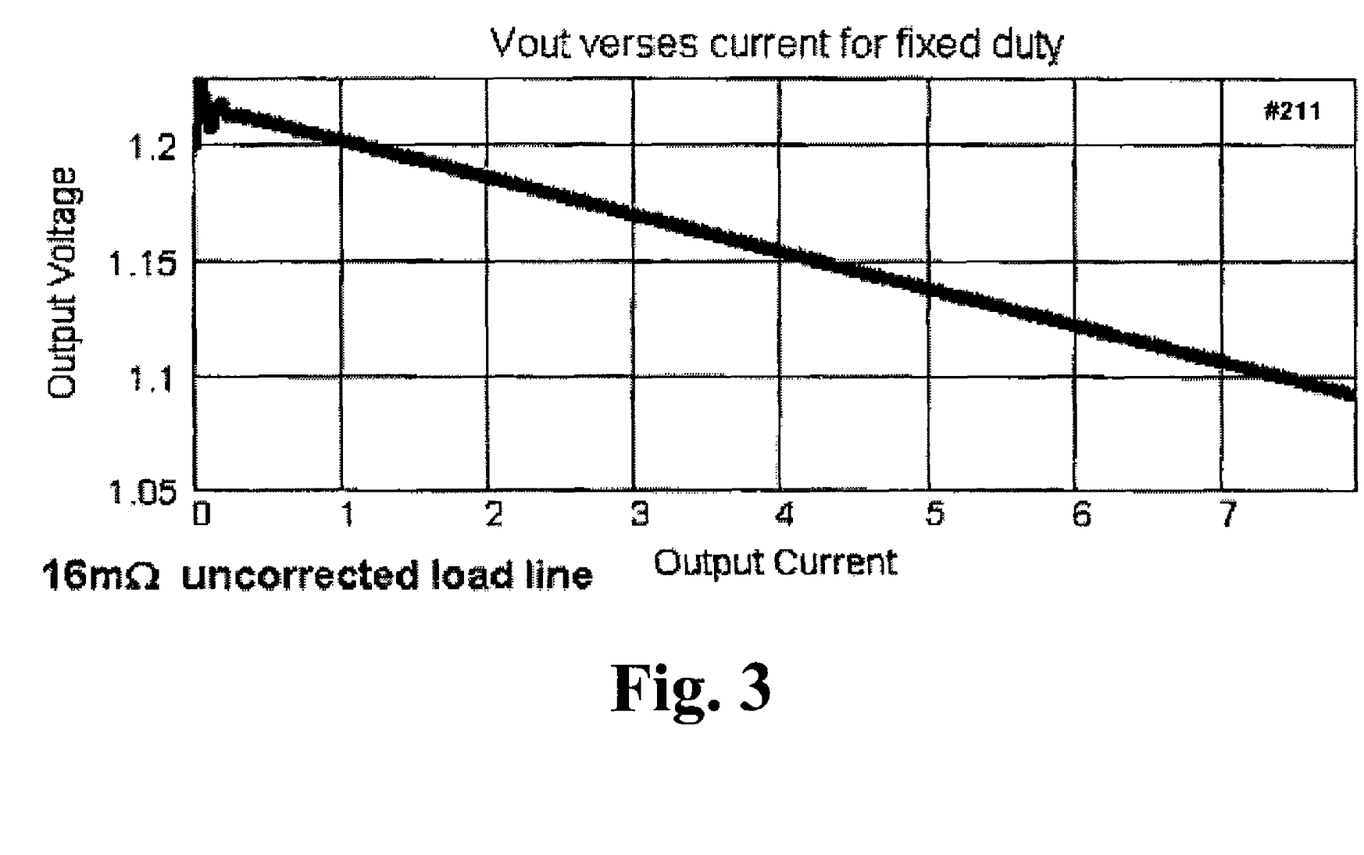
FIG. 3 is a graph illustrating the relationship between output voltage and output current in the circuit of FIG. 2.

In FIG. 2, a mathematical representation of a buck converter that utilizes simple feed forward control in the form of a DC correlator 20 is illustrated. The output stage of a buck converter is illustrated in much the same manner as in FIG. 1. The DC correlator 20 provides compensation for the input voltage based on a relationship between the input voltage $V_{IN}$ and a reference voltage $V_{REF}$ defined by the equation 203 in order to provide better output voltage control. FIG. 3 is a graph illustrating how output voltage drops in accordance with an increase in output current. This drop is in accordance with a 16 mΩ load line. The 16 mΩ resistance is the result of losses associated with the buck converter output and resistor 209.

If a feed back control loop were used, the feedback circuitry would correct the duty factor to maintain a constant output voltage.

Figure 4:
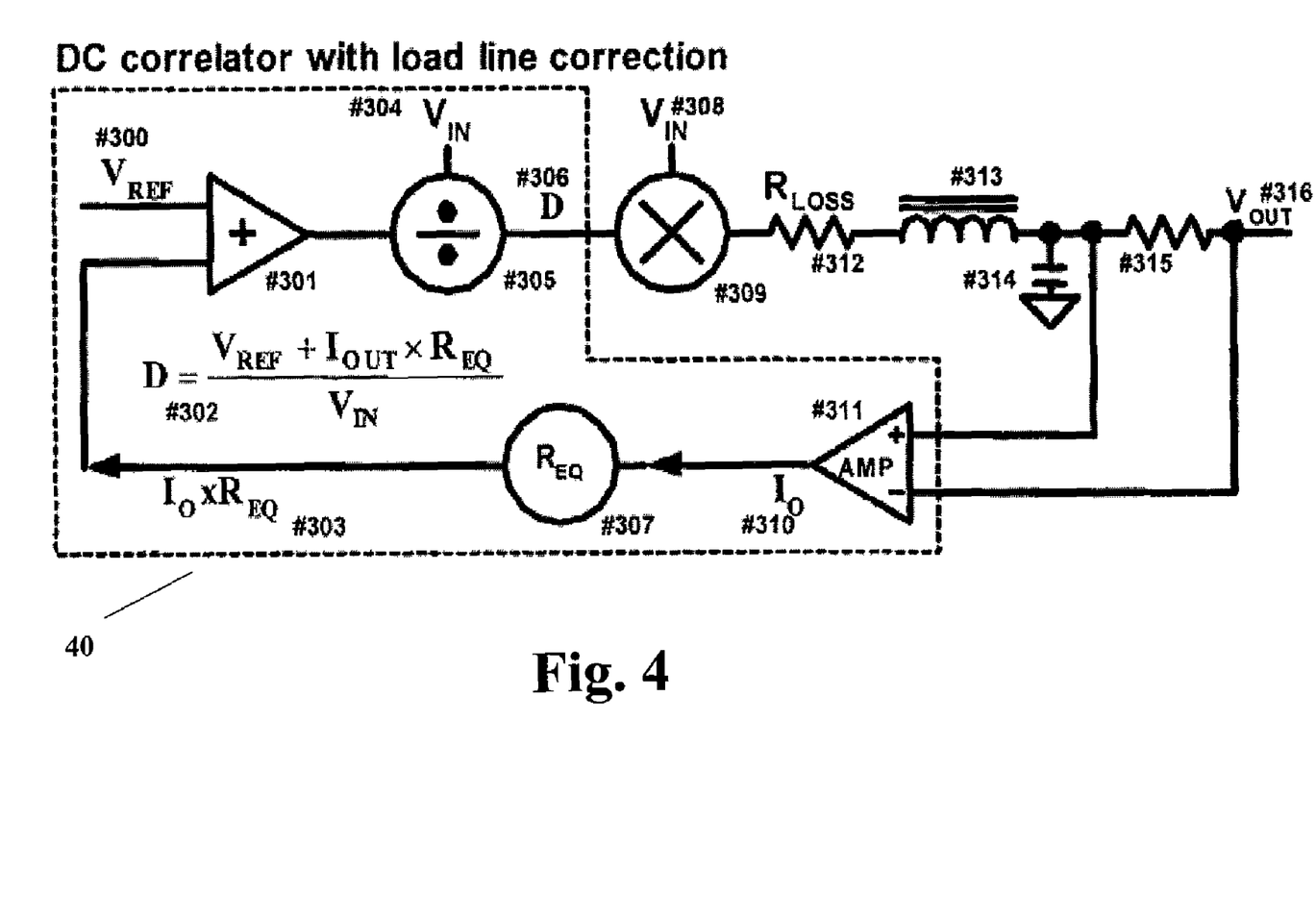
FIG. 4 illustrates a simplified mathematical representation of a buck converter with a feed forward correlator.

FIG. 4 illustrates a simplified mathematical representation of an output stage of a buck converter with a more complete feed forward correlator 40 that provides both input voltage compensation and load line compensation. The feed forward correlator 40 of FIG. 4 compensates for circuit losses. Output current, or load current, is measured via resistor 315 and amplifier 311. The result is multiplied by a coefficient $R_{EQ}$ by multiplier 307. The resulting signal 303 is summed with the reference voltage $V_{REF}$ at element 301 and the result is provided to the divider element 305 where it is divided by the input voltage $V_{IN}$ to provide the error value 306 (D).

Figure 5:
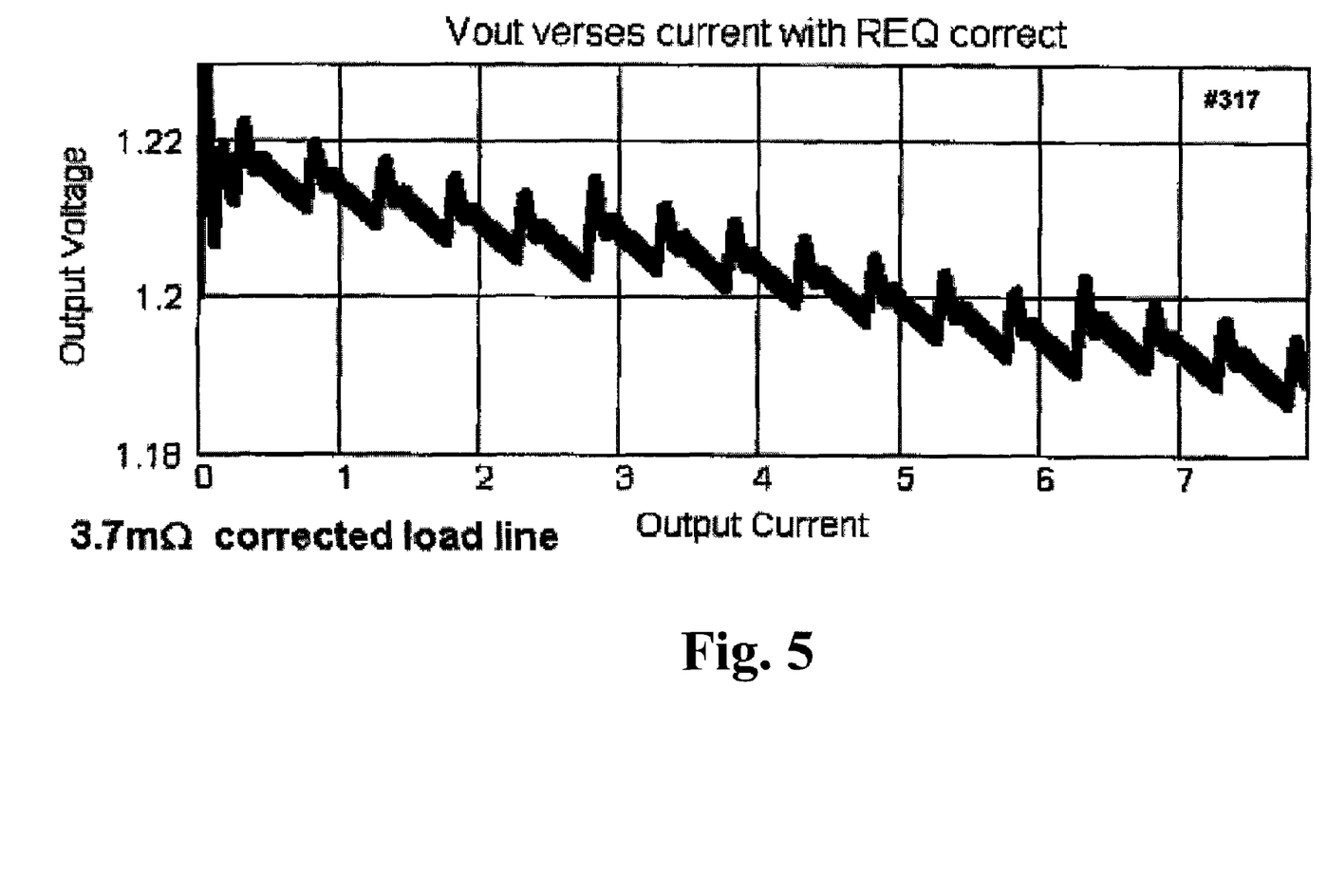
FIG. 5 is a graph illustrating the relationship between output voltage and output current in the circuit represented in of FIG. 4.

FIG. 5 illustrates the resulting corrected load line and indicates that the droop associated with the load current $I_L$ is virtually eliminated. In the graph of FIG. 5, the load line is about 3.7 mΩ which represents a great improvement over the 16 mΩ load line illustrated in FIG. 3. If desired, the coefficient $R_{EQ}$ could be modified in order to provide a load line of 0, or even a negative number. However, in this case $R_{EQ}$ has been set to eliminate 12.3 mΩ of the 16 mΩ load line of FIG. 3 because allowing a small load line resistance aids in improving load transient responses.

The feed forward control circuit 40 represented in FIG. 4 provides good load regulation. The saw tooth shape of the curve in FIG. 5 is due to quantization errors in the digital circuitry used in simulating the circuit, however, these errors are consistent with those that would occur in actual hardware implementations as well.

Figure 6A:
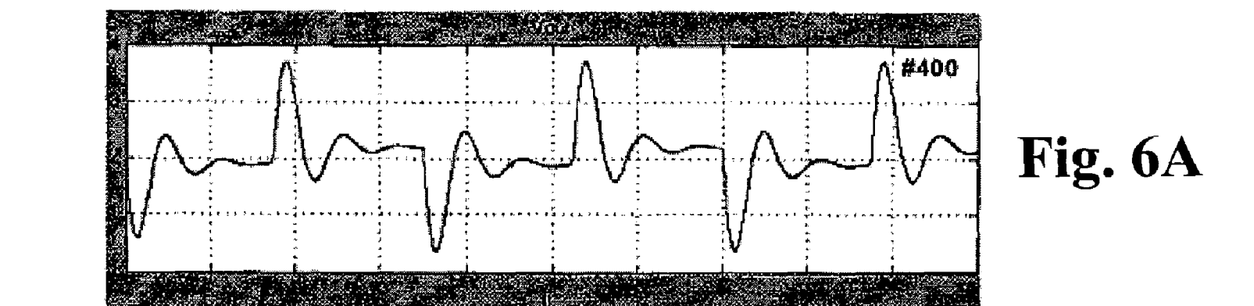
FIGS. 6A-6C are graphs illustrating the output voltage, inductor current and load current of the circuit of FIG. 4.
Figures 6B, 6C:
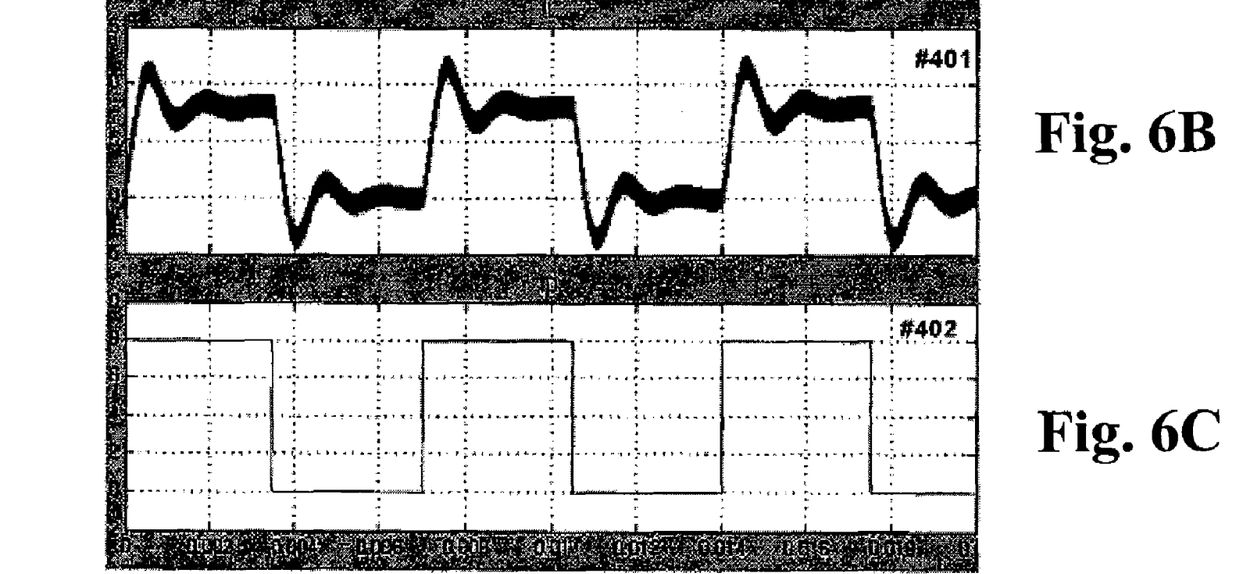

FIGS. 6A-6C illustrate the effect of load transients on the DC correlator of FIG. 4. As can be seen with reference to FIG. 6A, there are large over and undershoots in the output voltage ($V_{OUT}$). In the meantime, with reference to FIG. 6C, it appears that the output current, or load current, $I_O$ has a nearly instantaneous rise and fall time. However, as can be seen in FIG. 6B, the inductor current ($I_L$) rises and falls over a fairly significant period of time. The difference between the output current (load current) and the inductor current $I_L$ is what allows the large and undesirable variations in the output voltage $V_{OUT}$. While these variations may not be a problem in some applications, this variation is unacceptable in other applications that have narrow windows for these parameters, such as microprocessor power supplies.

Microprocessor power supplies are constantly subject to fast load transients and are required to maintain output voltage in a very small window. Thus, the results provided by the circuits represented in FIGS. 2 and 4 are unacceptable for use in this application.

Figure 7:
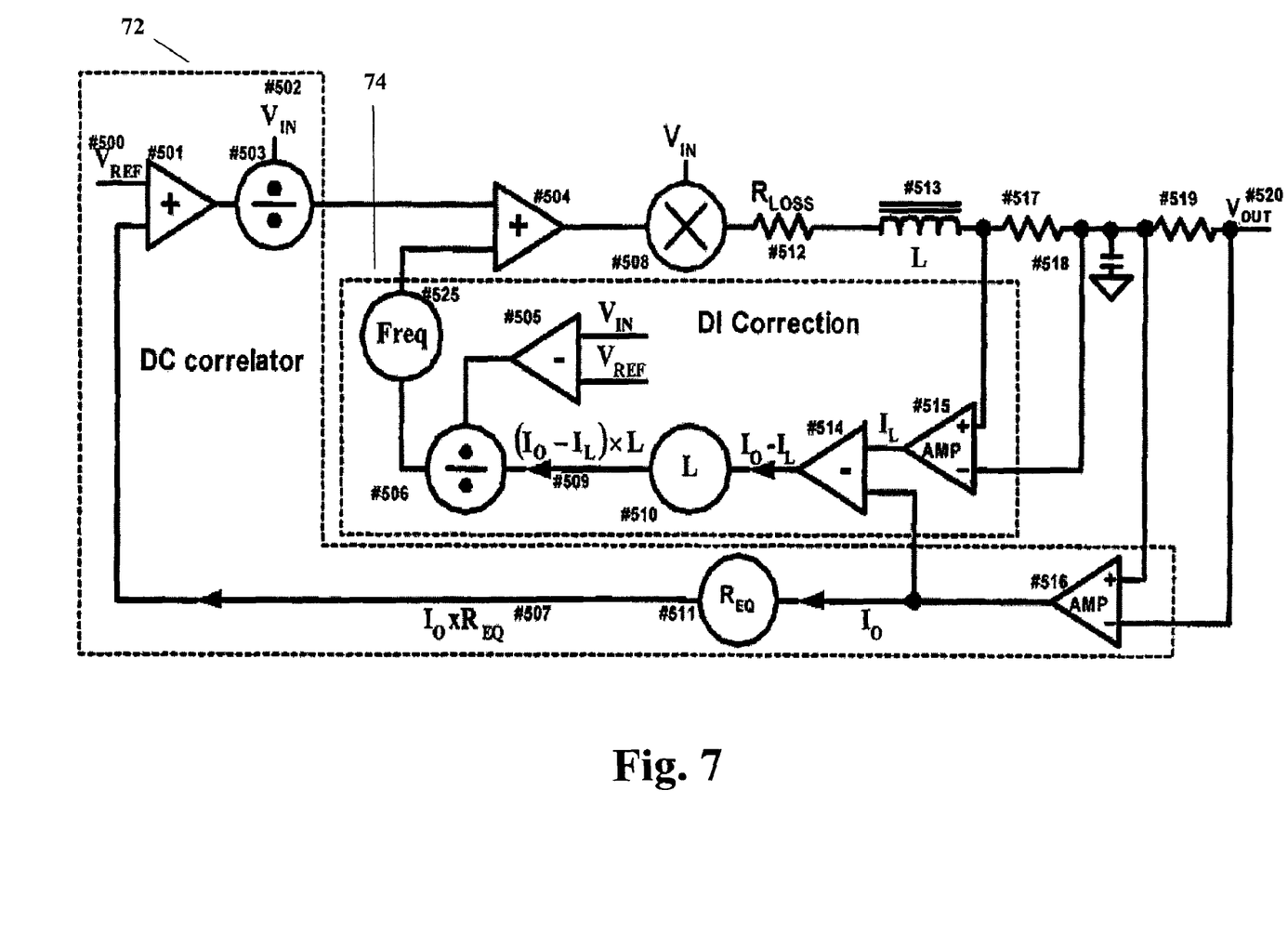
FIG. 7 illustrates a simplified mathematical representation of a buck converter with a feed forward correlator and a correction circuit in accordance with an embodiment of the present invention.

FIG. 7 illustrates a simplified mathematical representation of an output stage of a buck converter utilizing a feed forward control circuit 72 along with a correction circuit 74 in accordance with an embodiment of the present invention. The buck converter stage and feed forward control circuit 72 are similar to those illustrated in FIG. 5 and discussed above. The circuit of FIG. 7, however, includes a correction circuit 74. The correction circuit 74 provides information to make short term corrections to the duty factor used during pulse width modulation that rapidly changes the current in the output inductor 513. As noted above, it is the difference between inductor current $I_L$ and the output, or load current, $I_O$ that allows for the undesirable variations of the output voltage $V_{OUT}$. Thus, by providing correction information to rapidly change the inductor current, these voltage variations are limited, and thus, the output voltage is smoother and more consistent.

The correction circuit 74 preferably measures the difference between the inductor current $I_L$ through the inductor 513 (L) and the load current $I_O$ across resistance 519 and provides a correction value in accordance the following equation:

$$D = \frac{V_{REF} + I_{OUT} \times R_{EQ}}{V_{IN}} + \frac{(I_O - I_L) \times L \times Freq}{\#521\, V_{IN} - V_{REF}}$$

$$D \geq 0 \ \& \ D \leq 1$$

More specifically, the inductor current $I_L$ is determined across resistor 517 by the operational amplifier 515. The output current or load current $I_O$ is preferably obtained from the feed forward circuit 72 across resistor 519 via amplifier 516. The inductor current $I_L$ and the output current $I_O$ are compared in comparator element 514. The resulting difference signal is then multiplied by the inductance value of the inductor 513 at the multiplier 510. The result is then divided by the voltage across the inductor 513 which is determined by comparator 505 ($V_{IN}$-$V_{OUT}$). The result of this division is the required change of the power supply pulse width in seconds that is required to change the inductor current $I_L$ to be equal to the output, or load, current $I_O$. Multiplying this result by the frequency of the power supply (Freq.) at the multiplier 525 provides this value as a duty factor. This correction value may then be provided to the power supply via the summing block 504. Specifically, the correction value from the correction circuit 74 is added to the error value from the feed forward control circuit 72 by element 504 to provide a combined value used to adjust the pulse width modulation of the buck converter such that the inductor current $I_L$ matches the output or load current $I_O$.

Figure 8A:
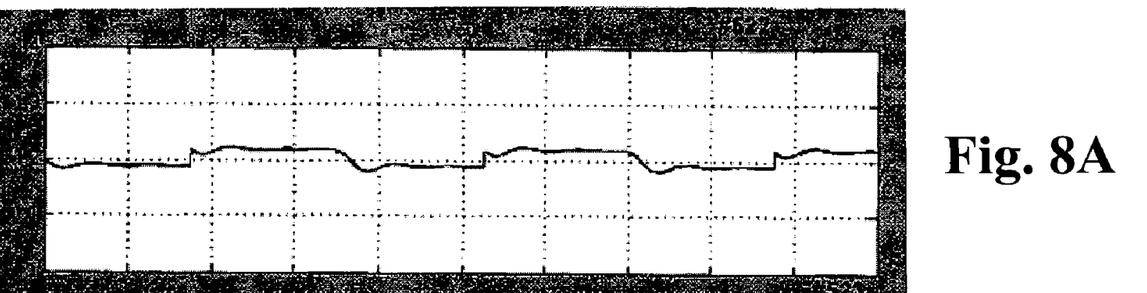
FIGS. 8A-8C are graphs illustrating the output voltage, inductor current and load current of the circuit of FIG. 7.
Figure 8B:
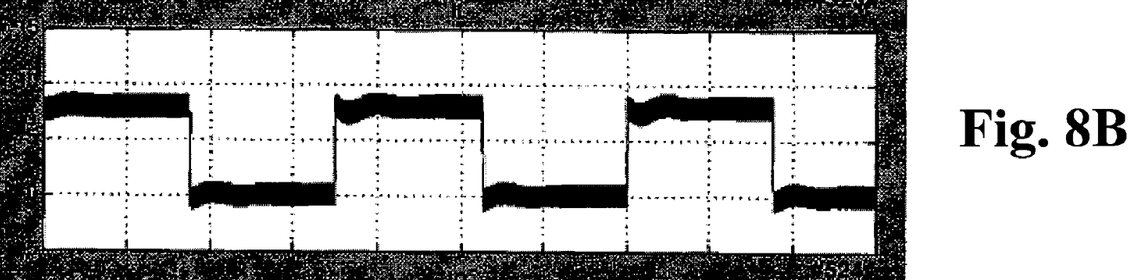
Figure 8C:
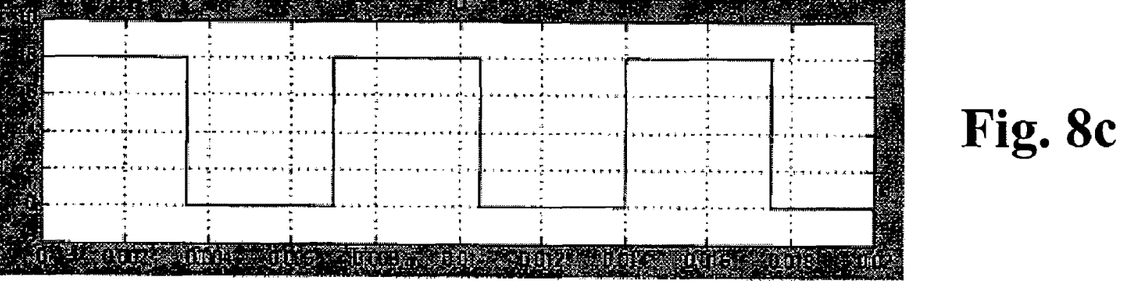

FIGS. 8A-8C illustrate the effect of load transients on the circuit of FIG. 7. As can be seen in FIG. 8A, the output voltage $V_{OUT}$ curve has been substantially smoothed out. The peak to peak ripple voltage of the output voltage has been reduced from approximately 320 mV in FIG. 6A to less than 50 mV in FIG. 8A. This is well within the narrow operation window of most power supply applications. As can be seen in FIG. 8C, the rise and fall of the output current $I_O$ is still substantially instantaneous. However, as can be seen in FIG. 8B, the rise and fall of the inductor current $I_L$ is much faster than that in FIG. 6B. Since the differences between inductor current $I_L$ and output current $I_O$ are minimized, less fluctuation of the output voltage $V_{OUT}$ occurs.

The respective elements of the correction circuit 74 may be implemented by any suitable digital or analog components.

For example, as is illustrated, differences between currents and voltages are typically determined using amplifiers. Further, multiplying and dividing circuit elements are well known in the art.

The circuit of FIG. 7 is an exemplary embodiment intended to illustrate the concept of the correction circuit 74, however, other variations are possible. For example, digital logic circuitry may be incorporated to engage or disengage the correction circuit 74 when desired. For example, the correction circuit 74 may be engaged when the difference between the inductor current $I_L$ and the output current $I_O$ is above a certain level and may disengage when below a certain value. Naturally, these values may be set as appropriate for the application.

Further, as is illustrated in FIG. 7, current sensing has been shown across lumped resistors. However, this is not the only possible implementation for this function. For example, inductor current sensing may be implemented via an inductor DCR as is described in U.S. Pat. No. 6,753,723, for example. In this reference, the difference between the output current $I_O$ and the inductor current $I_L$ is used to turn the synchronous FET on and off. This same value may be used in conjunction with the correction circuit 74 of the present application. In addition, the inductor current may be sensed as described in U.S. Pat. No. 6,381,159, the entire contents of which are hereby incorporated by reference herein. In addition, a circuit board trace resistance may be used to sense the inductor current $I_L$ and the output current $I_O$, if desired. Finally, the ESR of the output capacitor may be used to sense the output current if desired.

The correction circuit 74 of the present invention provides a correction value indicative of an adjustment to be made in the duty cycle of the pulse width modulation of a buck converter that will result in the inductor current matching the output current at a much faster rate. While described herein with reference to a buck converter, the correction circuit 74 may be used with virtually any switched power supply. Further, while specifically disclosed herein in conjunction with a feed forward DC correlator, the correction circuit 74 of the present invention may also be used with a feed back loop control circuit as well. In addition, the correction circuit 74 may be implemented in either digital or analog circuitry, and thus, is compatible with either analog or digital control circuits.

Figure 7A:
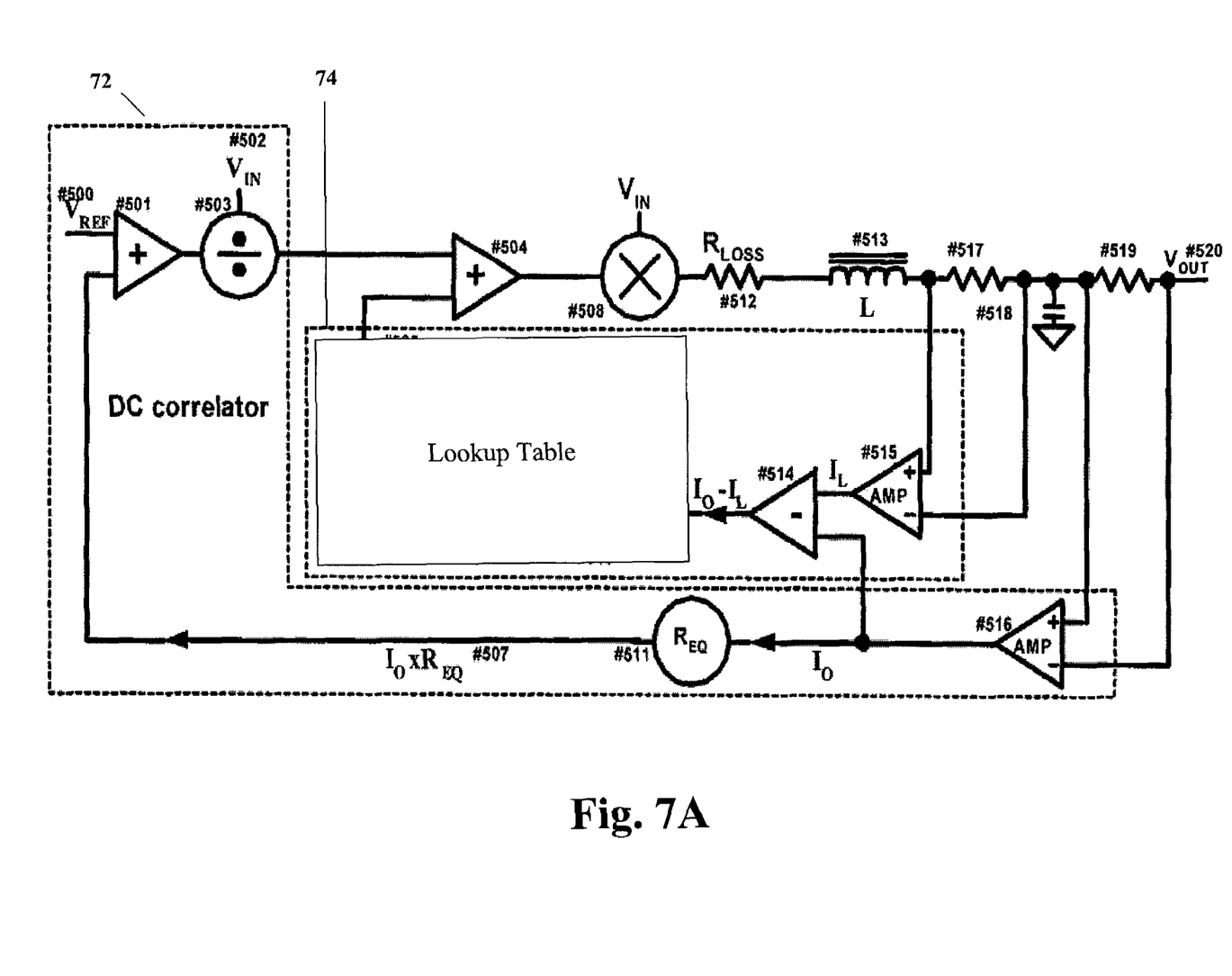
FIG. 7A illustrates a simplified mathematical representation of a buck converter with a feed forward correlator and a correction circuit in accordance with another embodiment of the present invention

Further, while the correction value of the correction circuit 74 is described as being calculated in the correction circuit, the correction signal value may be determined using a look up table based on the difference between the inductor current $I_L$ and the load current $I_O$, as is illustrated in FIG. 7A, for example. The look up table stores appropriate correction values and correlates the to specific current difference values. Thus, the correction value can simply be retrieved once the difference between the inductor current and the load current is determined. This embodiment would be particularly useful in a digital control circuit.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A correction circuit for use in correcting a duty cycle for pulse width modulation of a switched power supply to match an inductor current of the power supply to a load current, the correction circuit comprising:

a first comparator operable to compare the inductor current to the load current and to provide a current difference signal;
a first multiplier operable to multiply the current difference signal by an inductance value of the inductor of the switched power supply;
a second comparator operable to compare an input voltage of the switched power supply to an output voltage and to provide a voltage difference signal;
a divider operable to divide the output of the first multiplier by the voltage difference signal; and
a second multiplier operable to multiply the output of the divider by the frequency of the switched power supply to provide a correction value for use in adjusting a duty cycle of the pulse width modulation of the power supply such that the inductor current matches the output current.

2. The correction circuit of claim 1, wherein the correction value is added to an error value provided by a feed forward control loop to provide a combined value where the combined value is provided to adjust the pulse width modulation of the switched power supply.

3. The correction circuit of claim 2, wherein the first and second comparators, the first and second multipliers and the divider are implemented as analog digital circuit elements.

4. The correction circuit of claim 2, wherein the first and second comparators, the first and second multipliers and the divider are implemented as digital circuit elements.

5. The correction circuit of claim 1, wherein the correction value is added to an error value provided by a feedback control loop to provide a combined value where the combined value is provided to adjust the pulse width modulation for the switched power supply.

6. The correction circuit of claim 5, wherein the first and second comparators, the first and second multipliers and the divider are implemented as digital circuit elements.

7. The correction circuit of claim 3, wherein the first and second comparators, the first and second multipliers and the divider are implemented as analog circuit elements.

8. A switch power supply circuit comprising:
an output stage including an inductor and an output capacitor across which an output voltage is provided to a load, wherein the output voltage is controlled in part based on pulse width modulation; and
a correction circuit for use in correcting a duty cycle of the pulse width modulation such that an inductor current of the inductor is matched to a load current drawn by the load, the correction circuit comprising:
a first comparator operable to compare the inductor current to the load current and to provide a current difference signal;
a first multiplier operable to multiply the current difference signal by an inductance value of the inductor;
a second comparator operable to compare an input voltage of the switched power supply to the output voltage and to provide a voltage difference signal;
a divider operable to divide the output of the first multiplier by the voltage difference signal; and
a second multiplier operable to multiply the output of the divider by the frequency of the switched power supply to provide a correction value for use in adjusting the duty cycle of the pulse width modulation of the switched power supply such that the inductor current matches the load current.

9. The switched power supply of claim 8, further comprising a feed forward control loop operable to provide an error value, wherein the correction value of the correction circuit is added to the error value to provide a combined value, and wherein the combined value is provided to adjust the pulse width modulation of the switched power supply.

10. The switched power supply of claim 9, wherein the first and second comparators, the first and second multipliers and the divider of the correction circuit are implemented as digital circuit elements.

11. The switched power supply of claim 9, wherein the first and second comparators, the first and second multipliers and the divider of the correction circuit are implemented as analog circuit elements.

12. The switched power supply of claim 8, further comprising a feedback control loop operable to provide an error value, wherein the correction value of the correction circuit is added to the error value to provide a combined value, and wherein the combined value is provided to adjust the pulse width modulation of the switched power supply.

13. The switched power supply of claim 12, wherein the first and second comparators, the first and second multipliers and the divider of the correction circuit are implemented as digital circuit elements.

14. The switched power supply of claim 12, wherein the first and second comparators, the first and second multipliers and the divider of the correction circuit are implemented as analog circuit elements.

15. A switched power supply comprising:
an output stage including an output inductor and an output capacitor across which an output voltage is provided to a load, wherein the output voltage is controlled in part based on pulse width modulation;
a control circuit operable to control the output voltage of the switched power supply and to provide an error value for adjusting the pulse width modulation of the switched power supply to control the output voltage; and
a correction circuit for use in correcting a duty cycle of the pulse width modulation such that an inductor current of the inductor is matched to a load current drawn by the load, the correction circuit comprising:
a first comparator operable to compare the inductor current to the load current and to provide a current difference signal;
a first multiplier operable to multiply the current difference signal by an inductance value of the inductor;
a second comparator operable to compare an input voltage to the output voltage and to provide a voltage difference signal;
a divider operable to divide the output of the first multiplier by the voltage difference signal; and
a second multiplier operable to multiply the output of the divider by the frequency of the switched power supply to provide a correction value for use in adjusting the duty cycle of the pulse width modulation of the power supply such that the inductor current matches the load current.

16. The switched power supply of claim 15, wherein the control circuit is a feed forward control loop and the correction value of the correction circuit is added to the error value to provide a combined value, and wherein the combined value is provided to adjust the pulse width modulation of the switched-power supply.

17. The switched power supply of claim 15, wherein the control circuit is a feedback control loop, wherein the correction value of the correction circuit is added to the error value to provide a combined value, and wherein the combined value is provided to adjust the pulse width modulation of the power supply.

18. A switched power supply comprising:

an output stage including an inductor and an output capacitor across which an output voltage is provided to a load, wherein the output voltage is controlled in part based on pulse width modulation;

a control circuit configured to substantially continuously measure a load current drawn by said load; and a correction circuit coupled to said control circuit, said correction circuit configured to determine a difference between an inductor current of said inductor, as measured by said correction circuit, and said load current measured by said control circuit;

said correction circuit operable to provide a correction value for use in adjusting a duty cycle of the pulse width modulation such that the inductor current is matched to the load current, wherein the correction value is provided from a look up table based on said difference between the inductor current and the load current.

19. The switched power supply of claim 18, wherein said control circuit is further configured to control the output voltage of the switched power supply and to provide an error value for adjusting the pulse width modulation of the switched power supply to control the output voltage.

20. The switched power supply of claim 18, wherein said control circuit comprises a feed forward control loop operable to provide an error value, wherein the correction value of the correction circuit is added to the error value to provide a combined value, and wherein the combined value is provided to adjust the pulse width modulation of the switched power supply.

21. The switched power supply of claim 18, wherein said control circuit comprises a feedback control loop operable to provide an error value, wherein the correction value of the correction circuit is added to the error value to provide a combined value, and wherein the combined value is provided to adjust the pulse width modulation of the switched power supply.

22. The switched power supply of claim 18, wherein said correction circuit is implemented as a digital circuit.

23. The switched power supply of claim 18, wherein said control circuit is implemented as a digital circuit.

24. The switched power supply of claim 18, wherein said control circuit is implemented as an analog circuit.

25. The switched power supply of claim 18, wherein said switched power supply is implemented in a buck converter.

* * * * *